(12) United States Patent
Shang et al.

(10) Patent No.: US 11,036,530 B2
(45) Date of Patent: Jun. 15, 2021

(54) APPLICATION CONTINUOUS HIGH AVAILABILITY SOLUTION

(71) Applicant: VMware, Inc., Palo Alto, CA (US)

(72) Inventors: Jingliang Shang, Beijing (CN); Kecheng Lu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 183 days.

(21) Appl. No.: 15/294,799

(22) Filed: Oct. 17, 2016

(65) Prior Publication Data
US 2018/0107502 A1 Apr. 19, 2018

(51) Int. Cl.
G06F 9/455 (2018.01)
H04L 12/26 (2006.01)
G06F 11/07 (2006.01)

(52) U.S. Cl.
CPC .......... G06F 9/45558 (2013.01); G06F 11/07 (2013.01); H04L 43/10 (2013.01); *G06F 2009/45591* (2013.01)

(58) Field of Classification Search
CPC ...... H04L 43/10; G06F 11/07; G06F 9/45558; G06F 2009/45591
See application file for complete search history.

(56) References Cited

U.S. PATENT DOCUMENTS

| 5,590,277 | A * | 12/1996 | Fuchs | G06F 11/1438 |
| | | | | 714/16 |
| 6,625,751 | B1 * | 9/2003 | Starovic | G06F 11/1484 |
| | | | | 714/11 |
| 8,201,169 | B2 * | 6/2012 | Venkitachalam | G06F 9/45533 |
| | | | | 714/11 |
| 8,458,517 | B1 * | 6/2013 | Vermeulen | G06F 11/1474 |
| | | | | 709/201 |
| 8,826,283 | B2 * | 9/2014 | Chen | G06F 11/1446 |
| | | | | 718/100 |

(Continued)

OTHER PUBLICATIONS

"Multiple Buffering", Wikipedia, Retrieved from the Internet at < URL: https://en.wikipedia.org/wiki/Multiple_buffering#Double_ buffering_in_computer_graphics> on Aug. 22, 2016, last modified on Jul. 26, 2016.

(Continued)

*Primary Examiner* — Theodore C Parsons
*Assistant Examiner* — Bruce S Ashley
(74) *Attorney, Agent, or Firm* — Su IP Consuling (57) ABSTRACT

A method for a secondary host to support continuous availability for an application on a primary virtual machine on a primary host is disclosed. The method includes the secondary host creating a secondary virtual machine that is identical to the primary virtual machine, the secondary host receiving activities of the primary virtual machine from the primary host, the secondary host buffering the activities, and the secondary host determining if the buffered activities are safe to replay. When the buffered activities are determined to be safe to replay, the method includes the secondary host replaying the buffered activities to the secondary virtual machine. When the buffered activities are determined to be unsafe to replay, the method includes the secondary host discarding the buffered activities and setting the secondary virtual machine as a new primary virtual machine to take over a service provided by the application.

19 Claims, 5 Drawing Sheets

(56) References Cited

U.S. PATENT DOCUMENTS

| | | | |
|---|---|---|---|
| 9,817,733 B2* | 11/2017 | Mulcahy | G06F 12/145 |
| 10,417,102 B2* | 9/2019 | Sanakkayala | H04L 43/10 |
| 2006/0056285 A1* | 3/2006 | Krajewski, III | G05B 9/03 |
| | | | 370/216 |
| 2011/0022678 A1* | 1/2011 | Smith | G06F 21/552 |
| | | | 709/215 |
| 2011/0208908 A1* | 8/2011 | Chou | G06F 11/1662 |
| | | | 711/112 |
| 2016/0261480 A1* | 9/2016 | Agarwal | H04L 67/42 |
| 2017/0344282 A1* | 11/2017 | Kesavan | G06F 3/065 |

OTHER PUBLICATIONS

Mohan Dopheri et al., "VMware vCenter Server 6.0 Availability Guide", Technical Marketing Documentation, V 1.0, May 2015.
"VMware vSphere 6 Fault Tolerance—Architecture and Performance", Technical White Paper, Jan. 2016.

* cited by examiner

APPLICATION CONTINUOUS HIGH AVAILABILITY SOLUTION

BACKGROUND

Virtualization is the process of creating a software-based (or virtual) representation of something, including virtual computer hardware platforms, operating systems, storage devices, and computer network resources. Virtualization can apply to applications, servers, storage, and networks and is an effective way to reduce IT expenses while boosting efficiency and agility for all size businesses.

Virtualization can increase IT agility, flexibility, and scalability while creating significant cost savings. Workloads get deployed faster, performance and availability increases and operations become automated, resulting in IT that is simpler to manage and less costly to own and operate. However, for mission critical services, while existing virtualization platforms may support safeguards to ensure data integrity, detection of and recovery from unexpected crashes still require non-trivial amount of time, resulting in a perceived interruption in such services.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

VMware vSphere is an example platform for virtualization and cloud infrastructure. VMware vSphere manages collections of infrastructure, such as, without limitation, central processing units (CPUs), storage, and networking, as a seamless and dynamic operating environment, and also manages the complexity of a datacenter. VMware vSphere may include various components, such as, without limitation, VMware ESXi, an ESXi host, and a vCenter server. VMware ESXi is a hypervisor (e.g., a virtualization layer) that abstracts processor, memory, storage, and other physical resources into multiple virtual machines (VMs), and an ESXi host generally refers to a physical server that runs VMware ESXi. A vCenter server generally refers to a central point for configuring, provisioning, and managing virtualized information technology environments.

Figure 1:
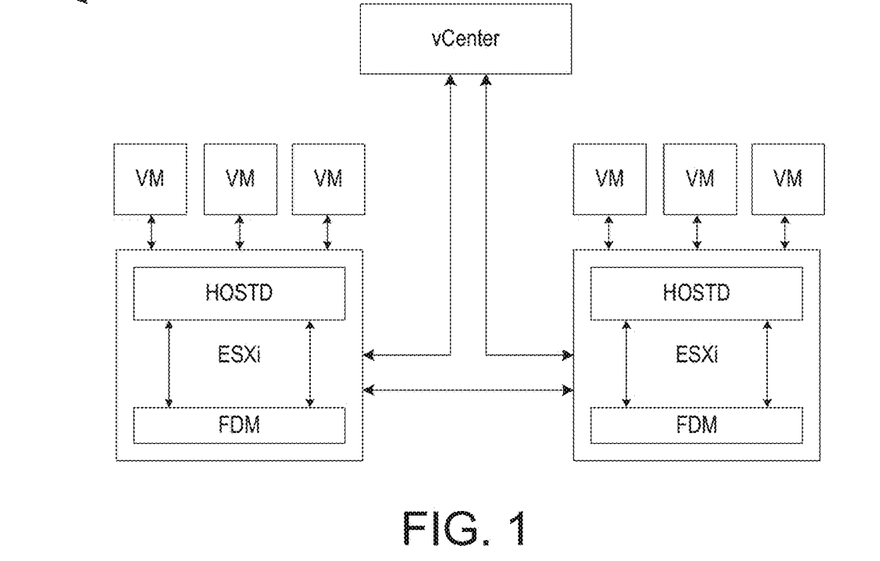
FIG. 1 illustrates an example cluster of hosts.

FIG. 1 illustrates an example vSphere cluster 100, which includes a group of ESXi hosts administered collectively by a vCenter server. vSphere cluster 100 may be enabled for vSphere High Availability (HA) (hereafter referred to as "vSphere HA cluster"). vSphere HA protects against an ESXi host failure by restarting its virtual machines on other ESXi hosts within the cluster. vSphere HA also protects against application failure by continuously monitoring a virtual machine or an application on the virtual machine and resetting the virtual machine in the event that a failure is detected. In some embodiments, there are three components that form the foundation for HA: Fault Domain Manager (FDM), HOSTD, and vCenter server.

FDM is the HA agent in ESXi that is responsible for tasks including communicating host resource information, virtual machine states, and HA properties to other ESXi hosts in the cluster. FDM also handles heartbeat mechanisms, virtual machine placement, virtual machine restarts, and logging.

HOSTD is the agent in ESXi responsible for tasks including powering on virtual machines. FDM communicates directly with HOSTD and vCenter server. FDM relies on HOSTD for information about the virtual machines that are registered to the ESXi host, and manages the virtual machines using HOSTD APIs.

vCenter server in vSphere cluster 100 is responsible for tasks including deploying and configuring FDM agents, communication of cluster configuration changes, and protection of virtual machines. vCenter server is responsible for pushing out the FDM agent to the ESXi hosts. vCenter server is also responsible for communicating configuration changes in the cluster to the host that is elected as the master.

When a user adds an ESXi host to vSphere HA cluster 100, vCenter server uploads an FDM agent to the ESXi host and configures it to communicate with other FDM agents in the vSphere HA cluster. Each ESXi host in vSphere HA cluster 100 functions as a master host or a slave host.

When HA is first enabled in vSphere HA cluster 100, all active hosts (those not in standby or maintenance mode, or not disconnected) participate in an election to choose the cluster's master host. Only one master host exists per cluster and all other hosts are slave hosts. If the master host fails, is shut down, or is removed from vSphere HA cluster 100, the slave hosts hold a new election.

The master host has a number of responsibilities. The master host monitors the state of slave hosts. If a slave host fails or becomes unreachable, the master host identifies which virtual machines need to be restarted.

The master host monitors the power state of all protected virtual machines. If one virtual machine fails, the master host ensures that it is restarted. Using a local placement engine, the master host also determines where the restart should be done.

The master host manages the lists of cluster hosts and protected virtual machines.

The master host acts as vCenter server management interface to the cluster and reporting the cluster health state.

The slave hosts contribute to vSphere HA cluster 100 by running virtual machines locally, monitoring their runtime states, and reporting state updates to the master host.

The master host monitors the liveness of the slave hosts in the cluster. This communication is done through the periodic exchange of network heartbeats. When the master host stops receiving these heartbeats from a slave host, it checks for host liveness before declaring the host to have failed. The master host performs the liveness check by determining whether the slave host is exchanging heartbeats with one or more shared datastores.

HA also provides virtual machine and application monitoring, which is performed by the FDM agent on each host. If the FDM agent does not receive heartbeats for a specific (and configurable) amount of time from a virtual machine or an application, the FDM agent restarts the virtual machine or the application.

Figure 2:
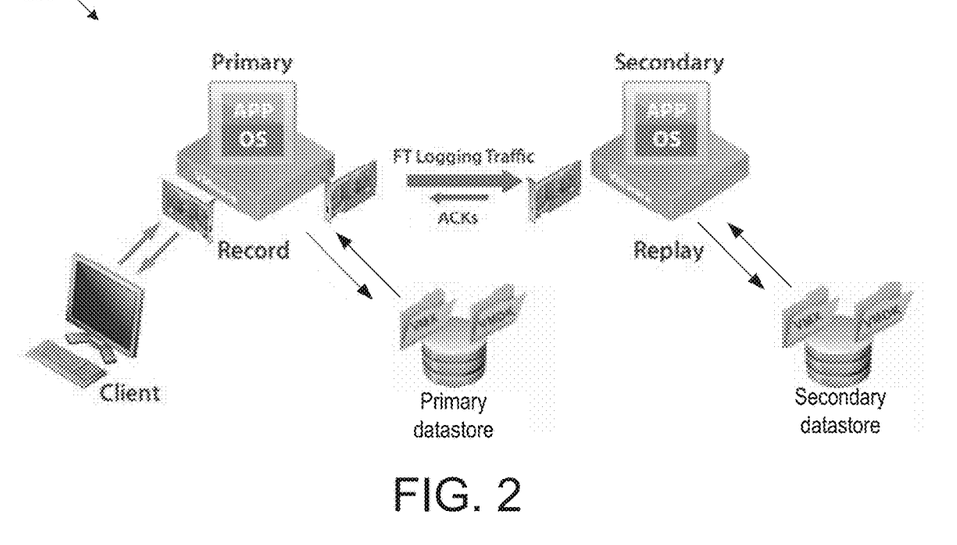
FIG. 2 illustrates a primary virtual machine and a secondary virtual machine in a fault tolerance pair.

FIG. 2 illustrates vSphere Fault Tolerance (FT) with a primary virtual machine and a secondary virtual machine in a fault tolerance pair. vSphere FT provides continuous availability to virtual machines, eliminating downtime and disruption—even in the event of a complete host failure.

vSphere FT works by continuously replicating an entire running virtual machine from one ESXi host to another. The result is that an FT-protected virtual machine has two replicas: the primary virtual machine and the secondary virtual machine, each running on distinct ESXi hosts. These replicas are logically identical—they represent a single virtual machine state and a single network identity, but they are physically distinct. Each replica has its own set of virtual machine files (including VMX and VMDK files), which vSphere FT automatically keeps in sync. When an ESXi host fails, one of the replicas will resume execution, and the virtual machine state, the network identity, and all active network connections for the virtual machine will be identical, ensuring a seamless failover process. vSphere FT is implemented by FT agent in the ESXi using four underlying technologies: storage, runtime state, network, and transparent failover.

vSphere FT ensures the storage of the primary and secondary virtual machines is always kept in sync. When vSphere FT protection is enabled, an initial synchronization of the virtual machine disks (VMDKs) occurs to ensure the primary and secondary virtual machines have the exact same disk state.

This initial synchronization happens whenever FT is turned on while the virtual machine is running, whenever FT protection is re-established after a failover occurs, or whenever a powered-off FT virtual machine powers on.

After this initial synchronization, vSphere FT will mirror VMDK write operations between the primary and secondary virtual machines over the FT network to ensure the storage of the replicas continues to be identical.

vSphere FT ensures the runtime state of the two replicas is always identical. It does this by continuously capturing the active memory and precise execution state of the virtual machine, and rapidly transferring them over a high-speed network, allowing the virtual machine to instantaneously switch from running on the primary ESXi host to the secondary ESXi host whenever a failure occurs.

The networks used by the virtual machine are also virtualized by the underlying ESXi host, ensuring that even after a failover, the virtual machine identity and network connections are preserved. vSphere FT manages the virtual MAC address as part of the process. If the secondary virtual machine is activated, the secondary ESXi host sends a gratuitous ARP so the network switch is aware of the new physical location of the virtual MAC address. Since vSphere FT preserves the storage, the precise execution state, the network identity, and the active network connections, the result is zero downtime and no disruption to users should an ESXi host failure occur.

vSphere FT ensures that the primary virtual machine always agrees with the secondary virtual machine. This is achieved by holding externally visible output from the primary virtual machine, and only releasing it when an acknowledgement is made from the secondary virtual machine affirming that the state of the two virtual machines is consistent (for the purposes of vSphere FT, externally visible output is network transmissions).

As described, vSphere HA provides hardware and virtual hardware layer protection for virtual machines. For guest OS and application layers, virtual machine and application monitoring provides rapid recovery from failures. The downtime from restarting virtual machines or applications ranges from seconds to minutes. This downtime, though quite small, is unacceptable for customers that provides business critical services.

For example, telecom operators provide high degree of service ability with their business critical applications. Even a few seconds of downtime can be fatal for their services. Similar or same situation applies to customers like banks and public cloud providers.

vSphere FT provides continuous protection with zero downtime and no loss of state or interruption in service. However, vSphere FT cannot detect guest OS or application level failures. If an ESXi host in a vSphere HA cluster hangs or crashes due to guest OS or application level errors, the secondary virtual machine would nonetheless copy the state of the primary virtual machine and also hang or crash.

Figure 3:
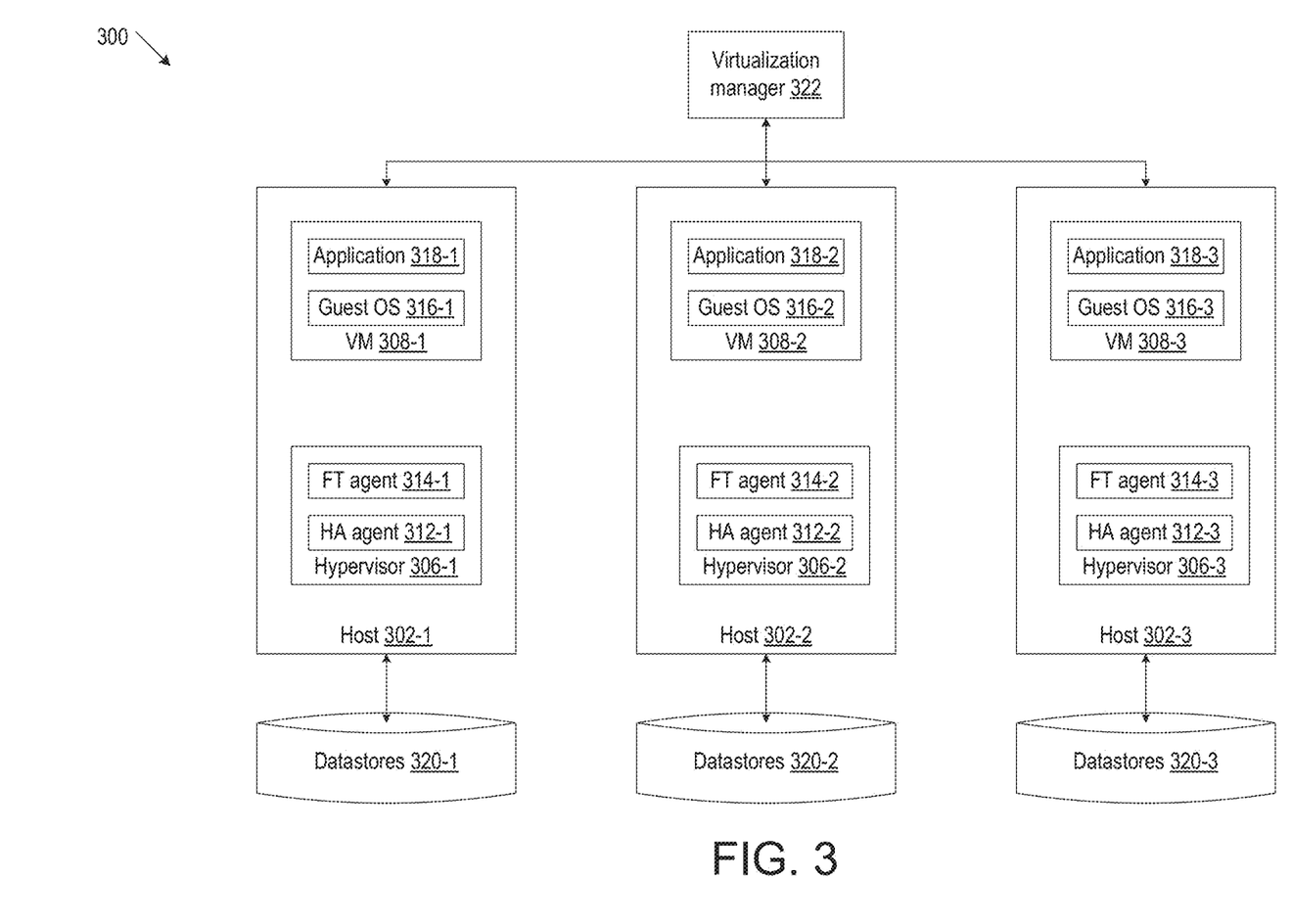
FIG. 3 shows a virtual machine (VM) system in examples of the present disclosure.

FIG. 3 shows a virtual machine (VM) system 300 in examples of the present disclosure. System 300 includes virtualization host computers 302-1, 302-2, and 302-3 (collectively as "hosts 302" or generically as an individual "host 302") coupled by a network 304. Host 302-1 includes physical memory, processor, local storage, and network interface cards (NICs). Host 302-1 runs a hypervisor 306-1 to create and run a virtual machine 308-1. Hypervisor 306-1 includes a HA agent 312-1 and a FT agent 314-1. Virtual machine 308-1 runs a guest OS 316-1 to run an application 318-1. Host 302-1 is coupled to a datastore 320-1, which stores the virtual machine disks for virtual machines 308-1. Hosts 302-2 and 302-3 are similarly configured.

A virtualization manager 322 centrally provisions and manages virtual and physical objects in VM system 300, such as virtual machines, clusters, and hosts. Virtualization manager 322 may run on one of hosts 302 or a dedicated host (not shown) coupled by network 304 to hosts 302. Together hypervisors 306-1, 306-2, 306-3 and virtualization manager 322 provide a virtualization platform that can implement information technology services such as web services, database services, and data processing services. Hypervisor 306-1, 306-2, and 306-3 may be VMware vSphere ESXi hypervisors, and virtualization manager 322 may be a VMware vCenter server.

Figure 4:
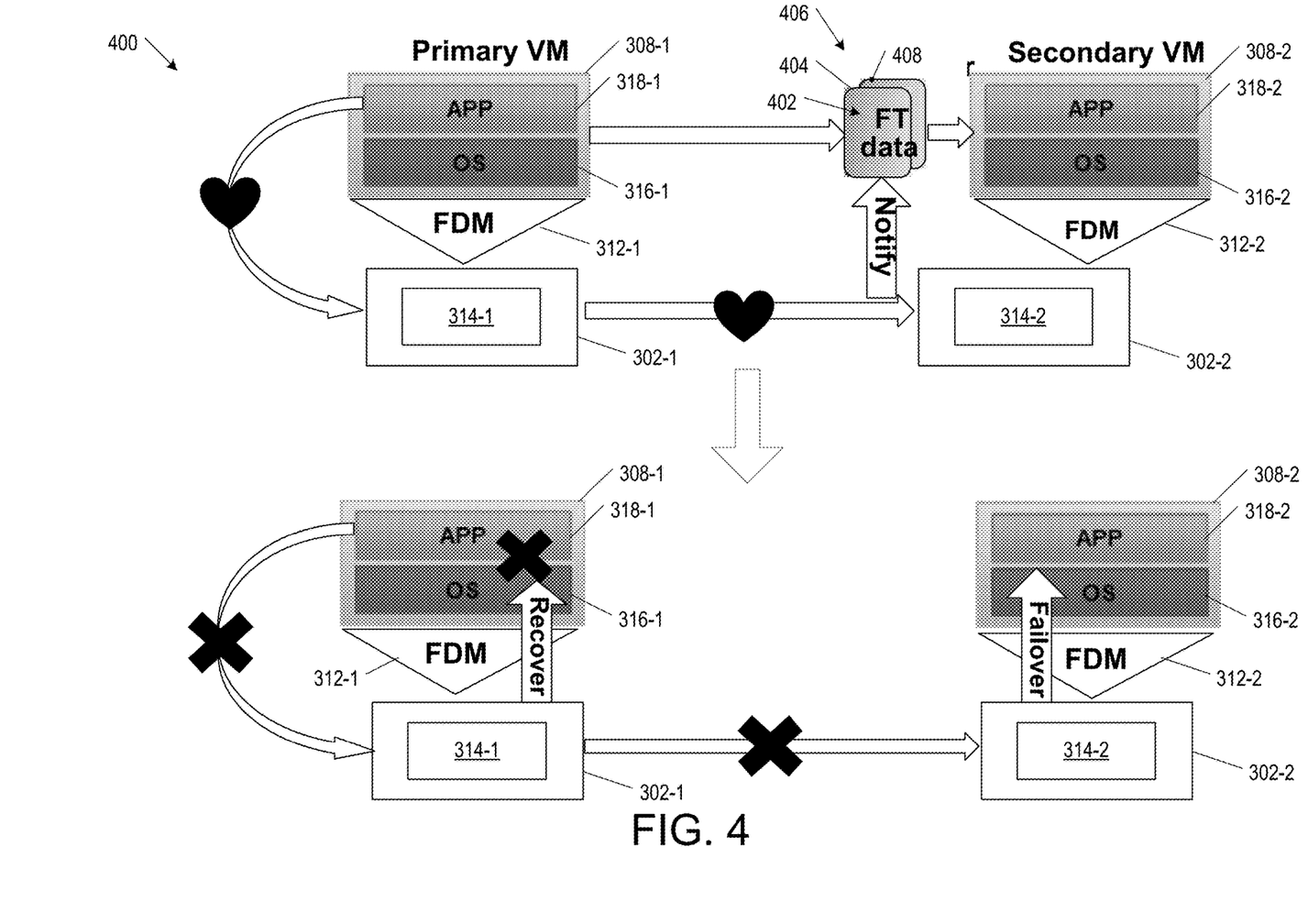
FIG. 4 illustrates a method for the system of FIG. 3 to provide application-level continuous availability with close to zero downtime in examples of the present disclosure.

FIG. 4 illustrates a method for VM system 300 to provide application-level continuous availability with close to zero downtime in examples of the present disclosure. For simplicity and clarity, some elements of VM system 300 are omitted.

Virtual machine 308-1 is a primary virtual machine and virtual machine 308-2 is a secondary virtual machine in a fault tolerance pair. Secondary virtual machine 308-2 runs a guest OS 316-2 and an application 318-2 that are identical to guest OS 316-1 and application 318-1 on primary virtual machine 308-1.

FT agent 314-1 on primary host 302-1 (hereafter "primary FT agent 314-1") records and transmits activities 402 of primary virtual machine 308-1 to secondary host 302-2.

Instead of immediately replaying activities 402 to secondary virtual machine 308-2, FT agent 314-2 on secondary host 302-2 (hereafter "secondary FT agent 314-2") buffers them. Secondary FT agent 314-2 waits to receive a notification that the buffered activities 402 are safe before replaying them to secondary virtual machine 308-2.

Application 318-1 on primary host 302-1 sends heartbeats to HA agent 312-1 on primary host 302-1 (hereafter "primary HA agent 312-1") to indicate it is healthy. Primary HA agent 312-1 forwards the heartbeats to HA agent 312-2 on secondary host 302-2 (hereafter "secondary HA agent 312-2"). When primary HA agent 312-1 does not receive a heartbeat from application 318-1 for a specific (and configurable) time interval, the primary HA agent 312-1 declares to primary FT agent 314-1 that primary virtual machine 308-1 has failed.

When secondary HA agent 312-2 receives a heartbeat within the specific time interval, the secondary HA agent sends the notification to secondary FT agent 314-2 that the buffered activities 402 are safe to replay to secondary virtual machine 308-2. When secondary HA agent 312-2 does not receive a heartbeat within the specific time interval, the secondary HA agent initiates failover by secondary FT agent 314-2 for secondary virtual machine 308-2 to become the new primary virtual machine and have application 318-2 take over services provided by the failed application 318-1.

Figure 5:
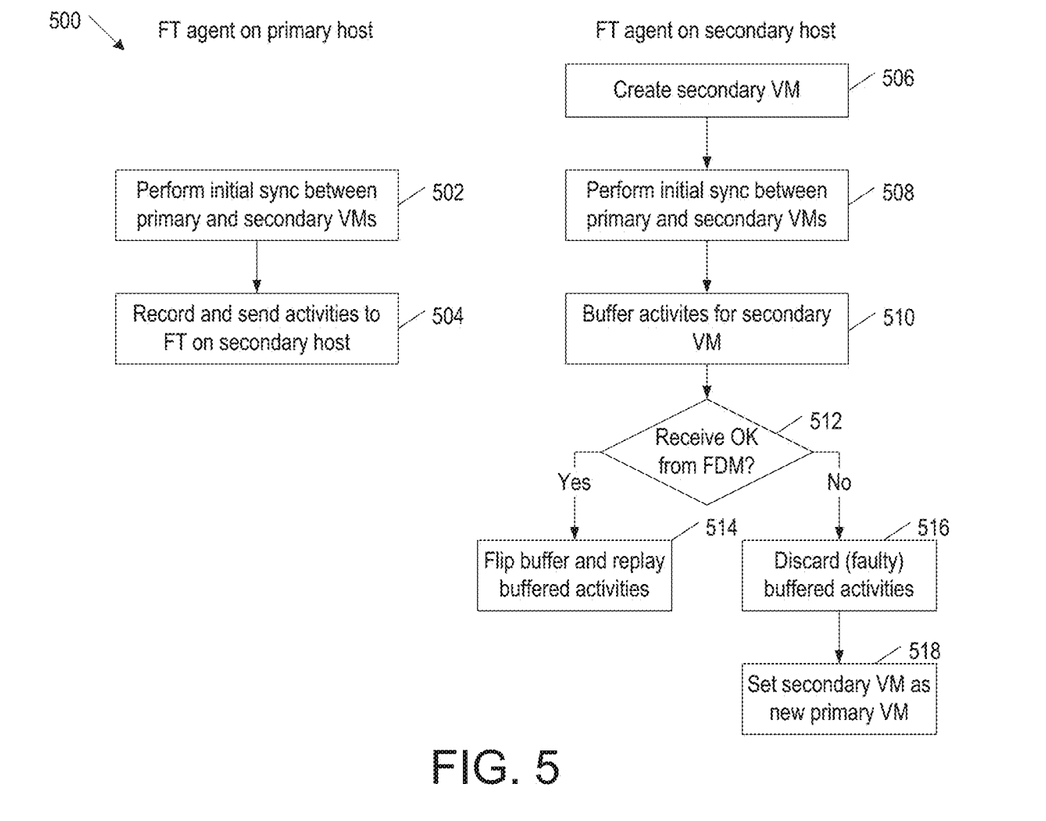
FIG. 5 is a flowchart of a method for primary and secondary fault tolerance (FT) agents in the system of FIG. 3 to perform in examples of the present disclosure.

FIG. 5 is a flowchart of a method 500 for primary FT agent 314-1 and secondary FT agent 314-2 (FIG. 3) in examples of the present disclosure. Method 500 may be performed in response to user input enabling fault tolerance for virtual machine 308-1, thereby making it the primary virtual machine. Blocks 502 and 504 represent actions performed by primary FT agent 314-1, and blocks 506 to 518 represent actions performed by secondary FT agent 314-2.

In block 502, primary FT agent 314-1 initially synchronizes primary virtual machine 308-1 (FIG. 3) to secondary virtual machine 308-2 (FIG. 3). Block 502 may be followed by block 504.

In block 504, primary FT agent 314-1 records activities 402 (FIG. 4) of primary virtual machine 308-1 and sends them to secondary FT agent 314-2. Block 504 may loop back to itself to record new activities of primary virtual machine 308-1 and sends them to secondary FT agent 314-2.

In block 506, secondary FT agent 314-2 creates secondary virtual machine 308-2 matched with primary virtual machine 308-1 in a fault tolerance pair. Block 506 may be followed by block 508.

In block 508, secondary FT agent 314-2 initially synchronizes secondary virtual machine 308-2 to primary virtual machine 308-1. Block 508 corresponds to block 502 performed by primary FT agent 314-1. Block 508 may be followed by block 510.

In block 510, secondary FT agent 314-2 receives activities 402 of the primary virtual machine 308-1 from primary FT agent 314-1 and buffers them. For example, secondary FT agent 314-2 saves activities 402 in a back buffer 404 of a double buffer 406 (FIG. 4). Block 510 corresponds to block 504 performed by primary FT agent 314-1. Block 510 may be followed by block 512.

In block 512, secondary FT agent 314-2 determines if it has received a notification from HA agent 312-2 that the buffered activities 402 are safe to replay to secondary virtual machine 308-2. If so, block 512 may be followed by block 514. Otherwise, block 512 may be followed by block 516.

In block 514, secondary FT agent 314-2 flips double buffer 406 and replays the buffered activities 402 from a front buffer 408 (FIG. 4) to secondary virtual machine 308-2. Block 514 may loop back to block 510 to save new activities of primary virtual machine 308-1 received from primary FT agent 314-1 in back buffer 404.

In block 516, secondary FT agent 314-2 discards the (faulty) buffered activities 402 in back buffer 404. Block 516 may be followed by block 518.

In block 518, secondary FT agent 314-2 sets secondary virtual machine 308-2 as a new primary virtual machine, which takes over the services for the failed primary virtual machine 308-1. As part of this process, the new primary FT agent 314-2 selects a new secondary host to create a new secondary virtual machine (e.g., a new secondary virtual machine 308-3 on a new secondary host 302-3 in FIG. 3). The new primary FT agent 314-2 then performs the actions described in blocks 502 and 504, while the new secondary FT agent 314-3 performs the actions described in blocks 506 to 518.

Figure 6:
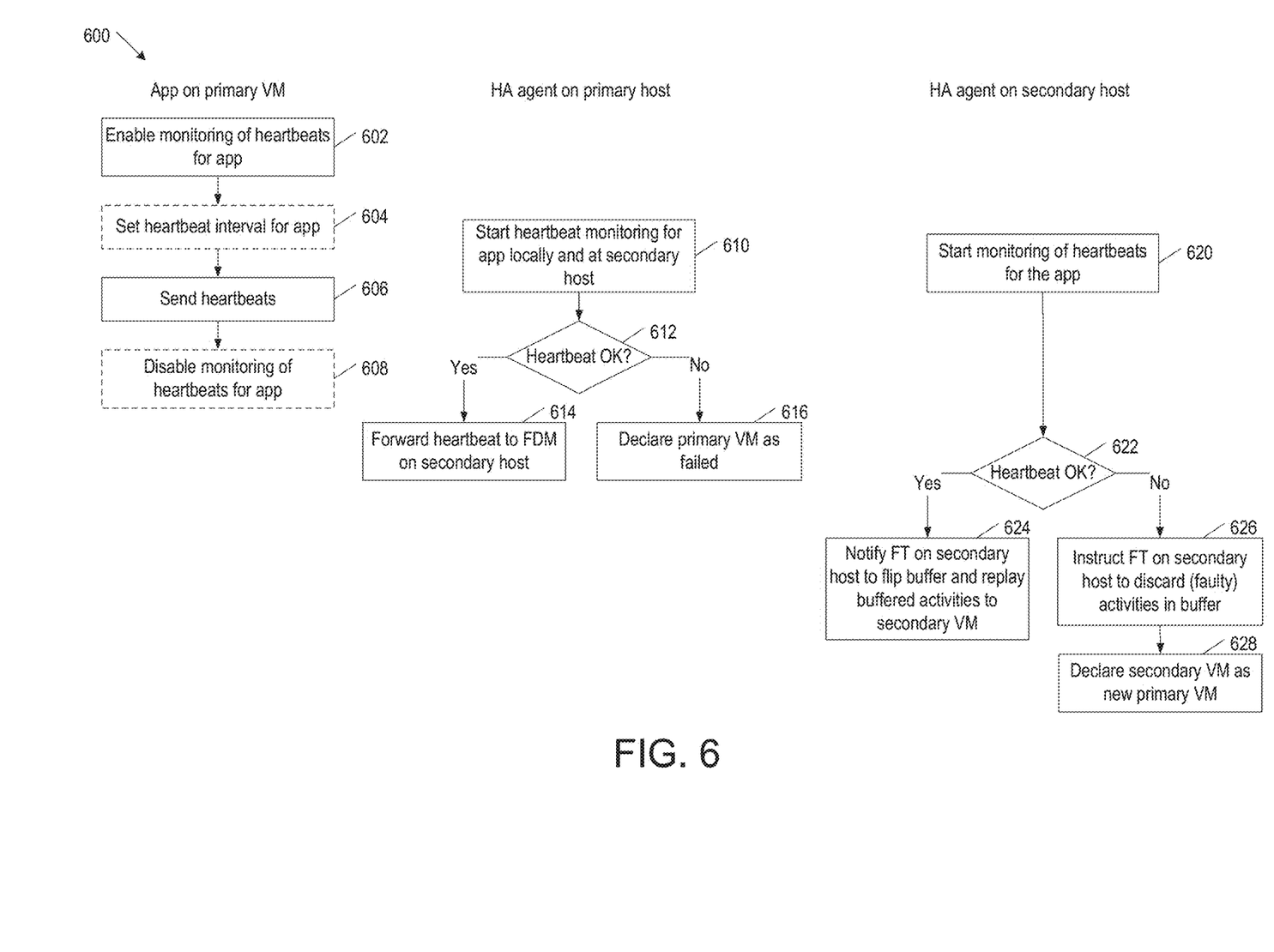
FIG. 6 is a flowchart of a method for an application on a primary host, a primary high availability (HA) agent, and a secondary HA agent in the system of FIG. 3 to perform in examples of the present disclosure.

FIG. 6 is a flowchart of a method 600 for application 318-1 on primary host 302-1 (FIG. 3), primary HA agent 312-1 (FIG. 3), and secondary HA agent 312-2 (FIG. 3) in examples of the present disclosure. Blocks 602 to 608 represent actions performed by application 318-1, blocks 610 to 616 represent actions performed by primary HA agent 312-1, and blocks 620 to 628 represent actions performed by secondary HA agent 312-2.

In block 602, application 318-1 enables monitoring of its heartbeats by primary HA agent 312-1. Application 318-1 may enable heartbeat monitoring when it starts. Block 602 may be followed by optional block 604.

In optional block 604, application 318-1 sets the heartbeat interval for sending heartbeats. Blocks 602 and 604 may be implemented by application 318-1 sending an interrupt VMAppFt_Enable_V1 (string appID, int HBInterval) to primary HA agent 312-1, wherein appID is an unique identification of the application and HBInterval is the heartbeat interval. Optional block 604 may be followed by block 606.

In block 606, application 318-1 periodically sends its heartbeat to primary HA agent 312-1 at the heartbeat interval. Application 318-1 may send an interrupt VMAppFt_HB_V1 (string appID) to HA agent 312-1. Block 606 may be followed by optional block 608.

In block 608, application 318-1 disables its heartbeat monitoring by primary HA agent 312-1. Application 318-1 may send an interrupt VMAppFt_Disable_V1 (string appID) to HA agent 312-1. Application 318-1 disables its heartbeat monitoring when it ends. Block 608 may end the actions of application 318-1.

In block 610, primary HA agent 312-1 starts monitoring the heartbeats of application 318-1. Block 610 corresponds to block 602 and optional block 604. Primary HA agent 312-1 also instructs secondary HA agent 312-2 to start monitoring the heartbeats of application 318-1. Block 610 may be followed by block 612.

In block 612, primary HA agent 312-1 determines if it has received a heartbeat from application 318-1 in a specific (and configurable) time interval. If so, block 612 may be followed by block 614. Otherwise, block 612 may be followed by block 616. Note the time interval may be set greater than the heartbeat interval so a certain number of heartbeats may be missed.

In block 614, primary HA agent 312-1 forwards the received heartbeat of application 318-1 to secondary HA agent 312-2. Block 614 may loop back to block 612 to continue heartbeat monitoring.

In block 616, primary HA agent 312-1 declares to primary FT agent 314-1 that primary virtual machine 308-1 has failed. Optionally, primary HA agent 312-1 notifies secondary HA agent 312-2 that primary virtual machine 308-1 has failed so the secondary HA agent can immediately initiate failover to secondary virtual machine 308-2. Block 616 may end the actions of primary HA agent 312-1.

In block 620, secondary HA agent 312-2 starts monitoring the heartbeats of application 318-1. Block 620 corresponds to block 610. Block 620 may be followed by block 622.

In block 622, secondary HA agent 312-2 determines if it has received, via primary HA agent 312-1, a heartbeat from application 318-1 in the specific (and configurable) time interval. If so, block 622 may be followed by block 624. Otherwise, block 622 may be followed by block 626. Note the time interval may be set greater than the heartbeat interval so a certain number of heartbeats may be missed. As described above, primary HA agent 312-1 may immediately notify secondary HA agent 312-2 that primary virtual machine 308-1 has failed so the secondary HA agent does not wait for the entire time interval before starting failover to secondary virtual machine 308-2.

In block 624, secondary HA agent 312-2 notifies secondary FT agent 314-2 that the buffered activities 402 are safe. Block 628 corresponds to block 512 (FIG. 5). Block 624 may loop back to block 622 to continue heartbeat monitoring.

In block 626, secondary HA agent 312-2 instructs secondary FT agent 314-2 (FIG. 3) to discard the (faulty) buffered activities 402 (FIG. 4) of primary virtual machine 308-1 in back buffer 404 of double buffer 406 (FIG. 4). Block 626 corresponds to block 512 (FIG. 5). Block 626 may be followed by block 628.

In block 628, secondary HA agent 312-2 declares to secondary FT agent 314-2 that secondary virtual machine 308-2 is the new primary virtual machine. Block 626 correspond to block 518 (FIG. 5), which causes the new primary FT agent 314-2 to set the secondary virtual machine 308-2 as the new primary virtual machine and select a new secondary host to create a new secondary virtual machine (e.g., a new secondary virtual machine 308-3 on a new secondary host 302-3 in FIG. 3). The new primary HA agent 312-2 then performs the actions described in blocks 610 to 616, while the new HA agent 312-3 performs the actions described in blocks 620 to 628.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for a secondary host to support continuous availability for an application on a primary virtual machine on a primary host, comprising:
the secondary host synchronizing, by a secondary fault tolerance (FT) agent of a hypervisor of the secondary host, a secondary virtual machine on the secondary host with the primary virtual machine, wherein the secondary virtual machine is matched with the primary virtual machine in a fault tolerance pair, the secondary virtual machine is a replica of the primary virtual machine;
the secondary host receiving, by the secondary FT agent, activities of the primary virtual machine from the primary host;
the secondary host buffering, by the secondary FT agent, the activities in a first buffer before replaying the activities to the secondary virtual machine from a second buffer;
the secondary host determining if the buffered activities are safe to replay;
in response to receiving, by a secondary high availability (HA) agent of the hypervisor of the secondary host from a primary HA agent of the primary host, a heartbeat from the application in a time interval indicating that the application on the primary host is healthy, the secondary host determining, by the secondary HA agent, the buffered activities to be safe to replay and replaying, by the secondary FT agent, the buffered activities from the second buffer to the secondary virtual machine; and
in response to failing to receive, by the secondary HA agent from the primary HA agent, the heartbeat in the time interval, the secondary host determining, by the secondary HA agent, the buffered activities to be unsafe to replay, discarding, by the secondary FT agent, the buffered activities before the buffered activities can be replayed to the secondary virtual machine and setting, by the secondary FT agent, the secondary virtual machine as a new primary virtual machine to take over a service provided by the application.

2. The method of claim 1, wherein determining if the buffered activities are safe to replay comprises the secondary host monitoring heartbeats of the application and determining if any of the heartbeats have arrived from the primary host in the time interval.

3. The method of claim 1, wherein:
the first buffer and the second buffer are included in a double buffer;
buffering the activities comprises the secondary host saving the activities in the first buffer; and
replaying the buffered activities comprises the secondary host flipping the double buffer to replay the buffered activities from the second buffer and save new activities of the primary virtual machine in the first buffer.

4. The method of claim 1, further comprising:
the primary host monitoring heartbeats of the application; and
when the primary host receives any of the heartbeats from the application in the time interval, forwarding the heartbeat to the secondary host.

5. The method of claim 4, further comprising:
when the primary host does not receive the heartbeat from the application in the time interval, declaring the primary virtual machine as failed; and
when the buffered activities are determined to be unsafe to replay, the secondary host selecting a new secondary host to create a new secondary virtual machine.

6. The method of claim 1, further comprising:
the application enabling the primary host to perform heartbeat monitoring on the application; and
the application periodically sending heartbeats to the primary host at a heartbeat interval.

7. The method of claim 1, further comprising:
in response to receiving the heartbeat in the time interval indicating that the application on the primary host is healthy, replaying the buffered activities to the secondary virtual machine while preserving at least active network connections of the primary virtual machine.

8. A non-transitory, computer-readable storage medium encoded with instructions executable by a processor of a secondary host to support continuous availability for an application on a primary virtual machine on a primary host, the instructions comprising:

the secondary host synchronizing, by a secondary fault tolerance (FT) agent of a hypervisor of the secondary host, a secondary virtual machine on the secondary host with the primary virtual machine, wherein the secondary virtual machine is matched with the primary virtual machine in a fault tolerance pair, the secondary virtual machine is a replica of the primary virtual machine;

the secondary host receiving, by the secondary FT agent, activities of the primary virtual machine from the primary host;

the secondary host buffering, by the secondary FT agent, the activities in a first buffer before replaying the activities to the secondary virtual machine from a second buffer;

the secondary host determining if the buffered activities are safe to replay;

in response to receiving, by a secondary high availability (HA) agent of a hypervisor of the secondary host from a primary HA agent of the primary host, a heartbeat from the application in a time interval indicating that the application on the primary host is healthy, the secondary host determining, by the secondary HA agent, the buffered activities to be safe to replay, and replaying, by the secondary FT agent, the buffered activities from the second buffer to the secondary virtual machine; and in response to failing to receive, by the secondary HA agent from the primary HA agent, the heartbeat in the time interval, the secondary host determining, by the secondary HA agent, the buffered activities to be unsafe to replay, discarding, by the secondary FT agent, the buffered activities before the buffered activities can be replayed to the secondary virtual machine and setting, by the secondary FT agent, the secondary virtual machine as a new primary virtual machine to take over a service provided by the application.

9. The storage medium of claim 8, wherein determining if the buffered activities are safe to replay comprises the secondary host monitoring heartbeats of the application and determining if any of the heartbeats have arrived from the primary host in a time interval.

10. The storage medium of claim 8, wherein:
the first buffer and the second buffer are included in a double buffer;
buffering the activities comprises the secondary host saving the activities in the first buffer; and
replaying the buffered activities comprises the secondary host flipping the double buffer to replay the buffered activities from the second buffer and save new activities of the primary virtual machine in the first buffer.

11. The storage medium of claim 8, wherein the instructions further comprises:
the primary host monitoring heartbeats of the application; and
when the primary host receives the heartbeat from the application in the time interval, forwarding the heartbeat to the secondary host.

12. The storage medium of claim 11, wherein the instructions further comprises:
when the primary host does not receive the heartbeat from the application in the time interval, declaring the primary virtual machine as failed; and when the buffered activities are determined to be unsafe to replay, the secondary host selecting a new secondary host to create a new secondary virtual machine.

13. The storage medium of claim 8, wherein the instructions further comprises:
the application enabling the primary host to perform heartbeat monitoring on the application; and
the application periodically sending heartbeats to the primary host at a heartbeat interval.

14. A system, comprising:
a primary host, comprising:
a hypervisor comprising a primary high availability (HA) agent and a primary fault tolerance (FT) agent; and
a primary virtual machine comprising an application; and
a secondary host, comprising:
another hypervisor comprising a secondary HA agent and a secondary FT agent; and
a secondary virtual machine being initially identical to the primary virtual machine;
wherein:
the primary FT agent is configured to record and send activities of the primary virtual machine from the primary host to the secondary host;
the secondary FT agent is configured to receive and buffer the activities of the primary virtual machine from the primary host in a first buffer before replaying the activities to the secondary virtual machine from a second buffer; and
the secondary HA agent is configured to:
determine if the buffered activities are safe to replay;
in response to receiving, by the secondary HA agent from the primary HA agent, a heartbeat from with the application in a time interval indicating that the application on the primary host is healthy, determine the buffered activities are safe to replay, and instruct the secondary FT agent to replay the buffered activities from the second buffer to the secondary virtual machine; and
in response to failing to receive, by the secondary HA agent from the primary HA agent, the heartbeat in the time interval, determine the buffered activities are unsafe to replay, instruct the secondary FT agent to discard the buffered activities before the buffered activities can be replayed to the secondary virtual machine and declares to the secondary FT agent that the secondary virtual machine is a new primary virtual machine to take over a service provided by the application.

15. The system of claim 14, wherein the secondary HA agent is configured to determine if the buffered activities are safe to replay by monitoring heartbeats of the application and determining if any of the heartbeats have arrived from the primary host in the time interval.

16. The system of claim 14, wherein:
the first buffer and the second buffer are included in a double buffer;
the secondary FT agent is configured to buffer the activities by saving the activities in the first buffer; and
the secondary FT agent is configured to replay the buffered activities by flipping the double buffer to replay the buffered activities from the second buffer and save new activities of the primary virtual machine in the first buffer.

17. The system of claim 14, wherein the primary HA agent is configured to:

monitor heartbeats of the application; and when the primary HA agent receives the heartbeat from the application in the time interval, forwarding the heartbeat to the secondary host.

18. The system of claim 17, wherein:

the primary HA agent is configured to, when the primary HA agent does not receive the heartbeat from the application in the time interval, declare the primary virtual machine as failed; and the secondary FT agent is configured to, when the secondary HA agent declares the secondary virtual machine is the new primary virtual machine, select a new secondary host to create a new secondary virtual machine.

19. The system of claim 14, wherein the application is configured to:

enable the primary HA agent to perform heartbeat monitoring on the application; and periodically send heartbeats to the primary HA agent at a heartbeat interval.

* * * * *